United States Patent
Clark et al.

[11] Patent Number: 6,111,726
[45] Date of Patent: Aug. 29, 2000

[54] DATA STORAGE CARTRIDGE WITH ROTARY SHUTTER

[75] Inventors: Jon R. Clark, Minneapolis; John W. Swanson, Mahtomedi, both of Minn.

[73] Assignee: Imation Corp., Oakdale, Minn.

[21] Appl. No.: 09/067,399

[22] Filed: Apr. 28, 1998

[51] Int. Cl.⁷ .................................................. G11B 23/03
[52] U.S. Cl. ............................................................ 360/133
[58] Field of Search .............................. 360/133, 97.02, 360/99.06; 369/291, 772

[56] References Cited

U.S. PATENT DOCUMENTS

| | | | |
|---|---|---|---|
| Re. 32,876 | 2/1989 | Wakabayashi et al. | 360/133 |
| 4,443,874 | 4/1984 | Steenberg | 369/291 |
| 4,471,397 | 9/1984 | Cloutier | 360/133 |
| 4,503,475 | 3/1985 | Hall | 360/137 |
| 4,504,879 | 3/1985 | Toldi et al. | 360/105 |
| 4,519,059 | 5/1985 | Denis | 369/74 |
| 4,622,618 | 11/1986 | Oishi et al. | 360/133 |
| 4,652,961 | 3/1987 | Dieffenbach | 360/133 |
| 4,683,506 | 7/1987 | Toldi et al. | 360/105 |
| 4,717,981 | 1/1988 | Nigam et al. | 360/133 |
| 4,722,012 | 1/1988 | Toldi et al. | 360/97 |
| 4,789,916 | 12/1988 | Oishi | 360/133 |
| 4,791,516 | 12/1988 | Seto | 360/133 |
| 4,864,437 | 9/1989 | Couse et al. | 360/75 |
| 4,864,452 | 9/1989 | Thompson et al. | 360/133 |
| 4,870,518 | 9/1989 | Thompson et al. | 360/97.01 |
| 4,977,475 | 12/1990 | Shiba et al. | 360/133 |
| 5,278,717 | 1/1994 | Sasaki et al. | 360/133 |
| 5,377,065 | 12/1994 | Morehouse et al. | 360/105 |
| 5,381,402 | 1/1995 | Lee et al. | 369/291 |
| 5,408,374 | 4/1995 | Morehouse et al. | 360/105 |
| 5,426,562 | 6/1995 | Morehouse et al. | 361/685 |
| 5,442,266 | 8/1995 | Morehouse et al. | 318/272 |
| 5,481,420 | 1/1996 | Cardona et al. | 360/99.06 |
| 5,558,291 | 9/1996 | Anderson et al. | 242/336 |
| 5,572,383 | 11/1996 | Hoshi et al. | 360/99.05 |
| 5,579,189 | 11/1996 | Morehouse et al. | 360/105 |
| 5,592,349 | 1/1997 | Morehouse et al. | 360/98.08 |
| 5,610,779 | 3/1997 | Kawana | 360/99.04 |
| 5,610,780 | 3/1997 | Nishizawa | 360/99.04 |
| 5,610,782 | 3/1997 | Tomoe et al. | 360/99.04 |
| 5,610,891 | 3/1997 | Choi | 369/77.2 |
| 5,612,940 | 3/1997 | Otsuka et al. | 369/77.2 |
| 5,636,095 | 6/1997 | McGrath et al. | 360/133 |
| 5,664,991 | 9/1997 | Barton, II | 451/65 |
| 5,666,347 | 9/1997 | Yoshida et al. | 369/282 |
| 5,671,109 | 9/1997 | Sumner et al. | 360/133 |
| 5,671,197 | 9/1997 | Matsuda et al. | 369/32 |
| 5,680,276 | 10/1997 | Takekado | 360/106 |
| 5,691,860 | 11/1997 | Hoppe | 360/97.02 |
| 5,930,090 | 7/1999 | Schick et al. | 360/133 |
| 5,943,186 | 5/1999 | Muse | 360/99.06 |
| 6,005,755 | 12/1999 | Muse et al. | 360/133 |

FOREIGN PATENT DOCUMENTS

| | | |
|---|---|---|
| 0 721 187 A2 | 7/1996 | European Pat. Off. |
| 2 228 818 | 9/1990 | United Kingdom |
| WO 88/09553 | 12/1988 | WIPO |
| WO 94/11873 | 5/1994 | WIPO |
| WO 94/29852 | 12/1994 | WIPO |
| WO 94/29862 | 12/1994 | WIPO |

*Primary Examiner*—Craig A. Renner
*Assistant Examiner*—Angel Castro
*Attorney, Agent, or Firm*—Eric D. Levinson

[57] ABSTRACT

The present invention provides a removable data storage cartridge in which the data storage media is first enclosed within a shutter assembly having a shutter window exposing less than half of the media. The shutter assembly is enclosed within a cartridge housing that includes a cartridge window. Rotation of the shutter assembly within the cartridge housing moves the removable data storage cartridge between an open position in which the shutter window is located within the cartridge window, thereby exposing the media, and a closed position in which the shutter window is located within the cartridge housing.

20 Claims, 6 Drawing Sheets

DATA STORAGE CARTRIDGE WITH ROTARY SHUTTER

FIELD OF THE INVENTION

The present invention relates to the field of removable data storage cartridges. More particularly, the present invention relates to removable data storage cartridges including rotary shutters and methods of manufacturing the same.

BACKGROUND OF THE INVENTION

Removable data storage cartridges typically include some mechanism to protect the data storage media when the cartridges are not in use. Typically those protective mechanisms are referred to as shutters. Many of the shutters expose openings in the data storage cartridges by moving translationally, i.e., in a straight line. One example of such a shutter is provided in connection with micro-floppy diskettes that include circular magnetic data storage media having a diameter of 3" inches (8.9 cm).

Shutters that rotate to expose a portion of the media can be useful to decrease the size of the data storage cartridge because the shutter and cartridge can more closely follow the contours of the circular media while also allowing the head actuator mechanism to position itself over the data recording area of the disk.

Other shutters rotate about a portion of the data storage cartridge to expose the media contained within the cartridge. One example of such a cartridge and shutter design is disclosed in U.S. Pat. No. 5,636,095 (McGrath et al.). The shutter 50 encloses a circular segment of the media. One disadvantage of the design of the cartridge and rotary shutter of McGrath et al. lies in the relatively large number of parts required to effect the design. Furthermore, assembly of the cartridge is difficult process. As a result, the cost of manufacturing the data storage cartridges is increased. In addition, the media itself cannot typically be tested until the entire cartridge is assembled, thereby increasing waste if the media does not meet the required performance standards.

Cost of manufacturing is an important consideration in the design of many data storage cartridges. Any benefit in terms of reduced manufacturing costs can be extremely important for data storage cartridges.

Another consideration in the design of data storage cartridges is the size of the cartridge relative to the size of the media. It is preferred that the cartridges maximize the portion of their volume occupied by the data storage media and reduce the portion of the volume devoted to the other components of the cartridge. Space utilization is an increasing concern as the size of devices using data storage cartridges continues to decrease.

SUMMARY OF THE INVENTION

The present invention provides a removable data storage cartridge in which the data storage media is first enclosed within a shutter assembly having a shutter window exposing less than half of the media. The shutter assembly is enclosed within a cartridge housing that includes a cartridge window. Rotation of the shutter assembly within the cartridge housing moves the removable data storage cartridge between an open position in which the shutter window is located within the cartridge window, thereby exposing the media, and a closed position in which the shutter window is located within the cartridge housing.

Advantages of the present invention include simplification of assembly of the removable data storage cartridge by first enclosing the data storage media within the shutter assembly such that the shutter assembly can then be placed within the cartridge housing to complete the manufacturing process. An additional advantage is that the media itself may be tested after the shutter assembly is completed, i.e., before the shutter assembly is located in the cartridge housing to complete the removable data storage cartridge. As a result, waste can be reduced if the media does not meet the required performance standards.

In one aspect, the present invention provides a removable data storage cartridge including data storage media in the form of a circular disk; a shutter assembly enclosing a portion of the media, the media mounted for rotation within the shutter assembly about an axis of rotation; a shutter window in the shutter assembly exposing an arc of less than 180 degrees of the outer circumference of the media; a cartridge housing enclosing at least a portion of the shutter assembly and the media, the shutter assembly mounted for rotation within the cartridge housing about the axis of rotation; a retaining ring within the cartridge housing, the retaining ring encircling more than half of the circumference of the shutter assembly, the shutter assembly mounted for rotation about the axis of rotation within the retaining ring; and a cartridge window in the cartridge housing; wherein the shutter assembly and cartridge housing are movable between an open position in which the shutter window is generally aligned with the cartridge window to expose a portion of the media and a closed position in which the media is generally enclosed within the shutter assembly and the cartridge housing.

In another aspect, the present invention provides a removable data storage cartridge including data storage media in the form of a circular disk of flexible magnetic data storage media; a shutter assembly enclosing more than half of the outer circumference of the media, the media mounted for rotation within the shutter assembly about an axis of rotation; a shutter window in the shutter assembly, the shutter window exposing an arc of less than 180 degrees of the outer circumference of the media; a cartridge housing enclosing at least a portion of the shutter assembly and the media; a retaining in the cartridge housing, the retaining ring encircling more than half of the circumference of the shutter assembly, the shutter assembly mounted for rotation about the axis of rotation within the retaining ring; and a cartridge window in the cartridge housing; wherein the shutter assembly and cartridge housing are movable between an open position in which the shutter window is generally aligned with the cartridge window to expose a portion of the media and a closed position in which the media is generally enclosed within the shutter assembly and the cartridge housing, and further wherein the included angle formed by the intersection point between the retaining ring and the shutter assembly, the axis of rotation, and the intersection point between a trailing edge of the shutter window and the outer circumference of the shutter assembly is less than 180 degrees when the shutter assembly and cartridge housing are in the closed position.

In another aspect, the present invention provides a method of manufacturing a removable data storage cartridge by locating data storage media including a circular disk within a shutter assembly, wherein the shutter assembly includes a shutter window having a leading edge and trailing edge, the shutter window exposing an arc of less than 180 degrees of the outer circumference of the media, and further wherein the media is mounted for rotation within the shutter assembly about an axis of rotation; and locating the shutter assembly and media within a cartridge housing the shutter assembly mounted for rotation within the cartridge housing about the axis of rotation, the cartridge housing including a cartridge window; wherein the shutter assembly and cartridge housing are movable between an open position in which the shutter window is generally aligned with the cartridge window to expose a portion of the media and a closed position in which the media is generally enclosed within the shutter assembly and the cartridge housing.

These and other features and advantages of the present invention are discussed below in connection with illustrative embodiments of the invention.

DETAILED DESCRIPTION OF ILLUSTRATIVE EMBODIMENTS OF THE INVENTION

The present invention provides a removable data storage disk cartridge including a rotary shutter protecting the data storage media located in the cartridge. The rotary shutter is mounted for rotary movement within the cartridge housing as discussed in more detail below. Preferably, the rotary shutter is provided as a shutter assembly that encloses a majority, i.e., more than half, of the media provided in the cartridge, while the cartridge housing preferably encloses more than half of the shutter assembly. As a result, the present invention provides a design that offers unique advantages in the manufacturing and testing of the removable data storage cartridges, as well as during use, as discussed below.

Figure 1:
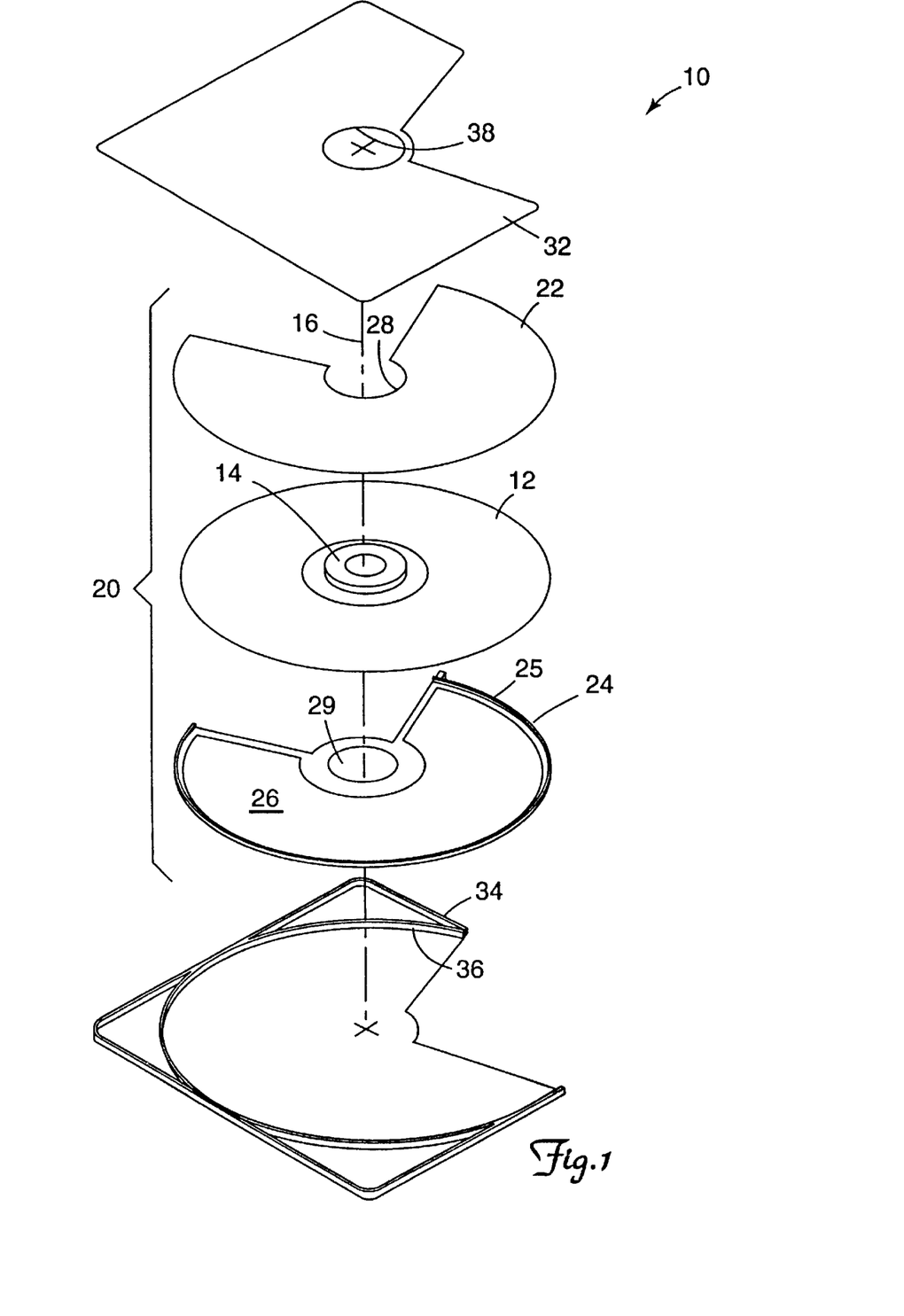
FIG. 1 is an exploded perspective view of one removable data storage cartridge according to the present invention.

FIG. 1 is an exploded perspective view of one removable data storage cartridge according to the present invention. The removable data storage cartridge 10 includes data storage media 12 in the form of a generally circular disc. It is preferred that the media 12 be attached to a hub 14 that is used to rotate the media 12 during read/write operations. The preferred hub 14 can be manufactured of any suitable materials including, but not limited to: metals, plastics, composites, etc.

The media 12 is preferably flexible magnetic data storage media, but could alternatively be rigid. Furthermore, although magnetic media is preferred, the media could also store data by any suitable mechanisms including, but not limited to: optically, combinations of optical and magnetic data storage, near-field recording, etc.

The media 12 is located within a shutter assembly 20 in a manner that allows for its rotation about the axis of rotation 16 within a volume defined within the shutter assembly 20. The shutter assembly 20 preferably includes a shutter base 22 and a shutter cover 24 located on opposing sides of the media 12. In the depicted embodiment, the shutter cover 24 includes a sidewall 25 which at least partially defines the volume in which the media 12 is located.

It is preferred, but not required, that the shutter assembly 20 also include at least one cleaning liner 26 located within the shutter assembly 20 in a manner that debris on one or both of the surfaces of the media 12 can be removed by the liner 26 during rotation of the media 12 within the shutter assembly 20. In the embodiment depicted in FIG. 1, only one liner 26 is shown (on the inside surface of the shutter cover 24), but a second liner is preferably located on the inner surface of the shutter base 22 as will be described in more detail below.

The preferred shutter assembly 20 includes a spindle opening 28 in the shutter base 22 and a wear disc 29 on the inside surface of the shutter cover 24. The spindle opening 28 allows the drive spindle of disk drive to contact the hub 14 of the media 12, while the wear disc 29 preferably provides a surface having a desired amount of friction against which the hub 14 rotates during use. Preferably, the wear disc 29 will have a relatively low coefficient of static friction.

The shutter base 22 can be secured to the shutter cover 24 by any suitable technique including, but not limited to: ultrasonic welding, adhesives, mechanical fasteners, etc. When assembled together, the shutter assembly 20 includes a shutter window 40 that exposes a portion of the media 12 located within the shutter assembly 20. One preferred shutter window 40 exposes a circular segment of the media 12 and is defined by a leading edge 42 and a trailing edge 44. It is preferred, but not required, that both sides of the media 12 within the shutter window 40 are exposed.

It is preferred that the shutter window 40 expose less than half of the media 12, i.e., more than 180 degrees of the circumference of the media 12 should be located within or encircled by the shutter assembly 20. Alternatively, that feature can be defined as indicating that the shutter window 40 should expose an arc of less than 180 degrees of the outer circumference of the media 12. By exposing an arc of less than 180 degrees, the shutter assembly 20 is able to retain the media 12 by interference, i.e., that media 12 is prevented from slipping out of the shutter assembly 20 without some deformation of the media 12. Because the arc exposed by the shutter window 40 (or encircled by the shutter assembly 20) is defined with reference to the outer circumference of the media 12, the actual shape of the leading and trailing edges 42 and 44 can vary with the important features being defined by the intersection points of the leading and trailing edges 42 and 44 of the shutter window 40 with the outer circumference of the media 12.

The shutter assembly 20 is located within the cartridge housing which, in the case of the embodiment depicted in FIG. 1, is provided in two pieces, i.e., cartridge housing base 32 and cartridge housing cover 34. The preferred cartridge housing base 32 and cartridge housing cover 34 preferably define a volume in which the shutter assembly 20 (including media 12) are located. When assembled, the cartridge housing preferably captures the shutter assembly 20 such that the shutter assembly 20 cannot be removed from the cartridge housing without some disassembly of the cartridge housing base 32 and cover 34.

In the depicted embodiment, the cartridge housing cover 34 includes a retaining ring 36 that assists in retaining the shutter assembly 20 in the proper position during assembly of the cartridge housing base 32 and the cartridge housing cover 34. It is preferred that the retaining ring 36 encircle more than half of the outer circumference of the shutter assembly 20. Although one preferred retaining ring 36 is depicted as being continuous in the embodiment depicted in FIG. 1, it could be provided as a number of separate portions defining a generally circular cavity in which the shutter assembly 20 is located when the removable data storage cartridge 10 is assembled.

The depicted cartridge housing base 32 preferably includes a spindle opening 38 through which the drive spindle of a disk drive can access the hub 14 of the media 12 during operation. It is preferred that the spindle opening 38 in the cartridge housing base 32 be generally aligned along the axis of rotation 16 with the spindle opening 28 in the shutter base 22.

Figure 2:
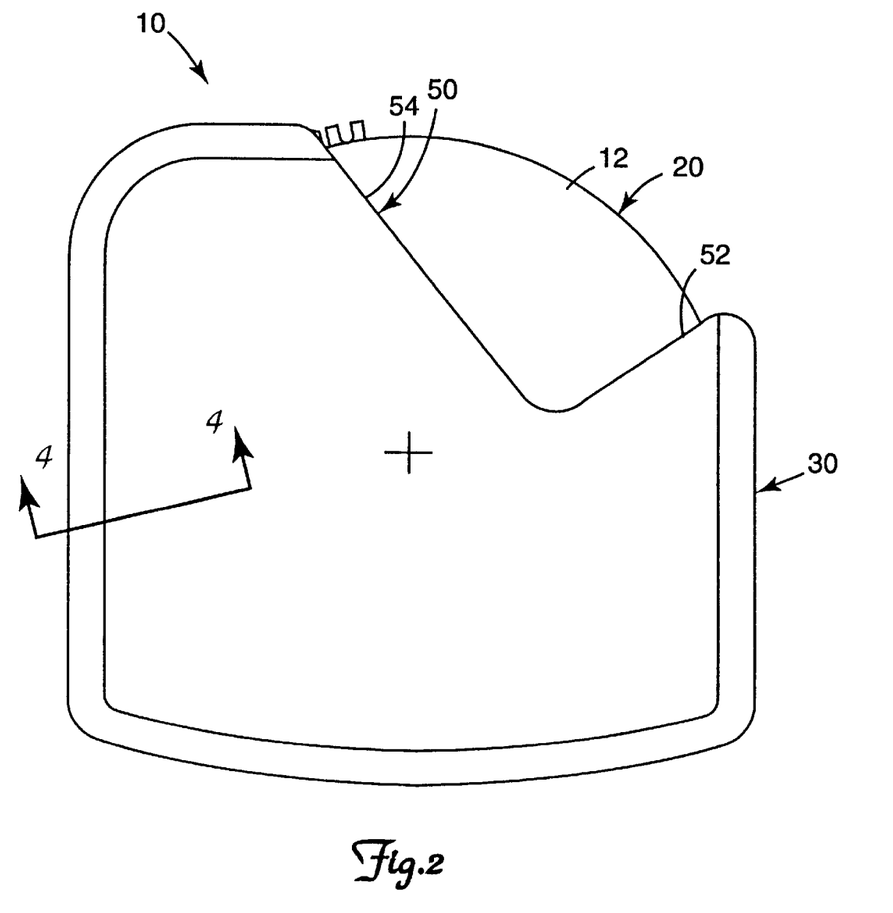
FIG. 2 is a plan view of a removable data storage cartridge with the shutter assembly in the closed position.

The cartridge housing base 32 can be secured to the cartridge housing cover 34 by any suitable technique including, but not limited to: ultrasonic welding, adhesives, mechanical fasteners, etc. When assembled as seen in, e.g., FIG. 2, the cartridge housing base 32 and cover 34 define a cartridge window 50 defined by a first edge 52 and a second edge 54. One preferred cartridge window 50 forms a generally circular segment as can be seen in FIG. 2. It is preferred, but not required, that both the cartridge housing base 32 and cover 34 within the area of the cartridge window 50 be removed to expose both sides of the shutter assembly 20.

FIG. 2 is a plan view of the removable data storage cartridge 10 of FIG. 1 as assembled with the shutter assembly 20 in the closed position within the cartridge housing 30. The cartridge housing 30 is formed by the cartridge housing base 32 and cartridge housing cover 34 as seen in FIG. 1. In that position, the shutter assembly 20 is exposed within the cartridge window 50 (defined by the first edge 52 and second edge 54), but the shutter window 40 (not shown) is located within the cartridge housing 30. As a result, the media 12 exposed within the shutter window 40 remains enclosed within the cartridge housing 30.

Figure 3:
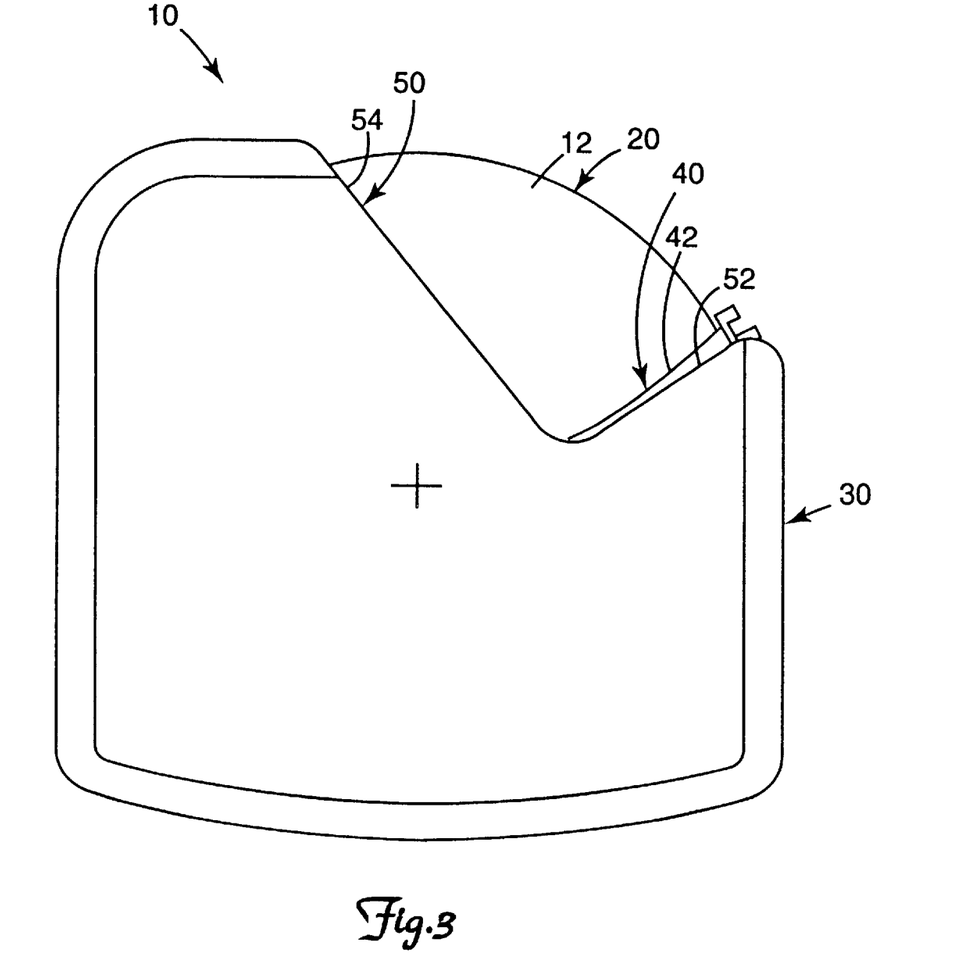
FIG. 3 is a plan view of a removable data storage cartridge of FIG. 2 with the shutter assembly in the open position.

FIG. 3 is a plan view of the removable data storage cartridge 10 of FIG. 1 as assembled with the shutter assembly 20 in the open position within the cartridge housing 30. In that position, the shutter window 40 is located within the cartridge window 50 such that the media 12 is exposed within the two windows.

Figure 4:
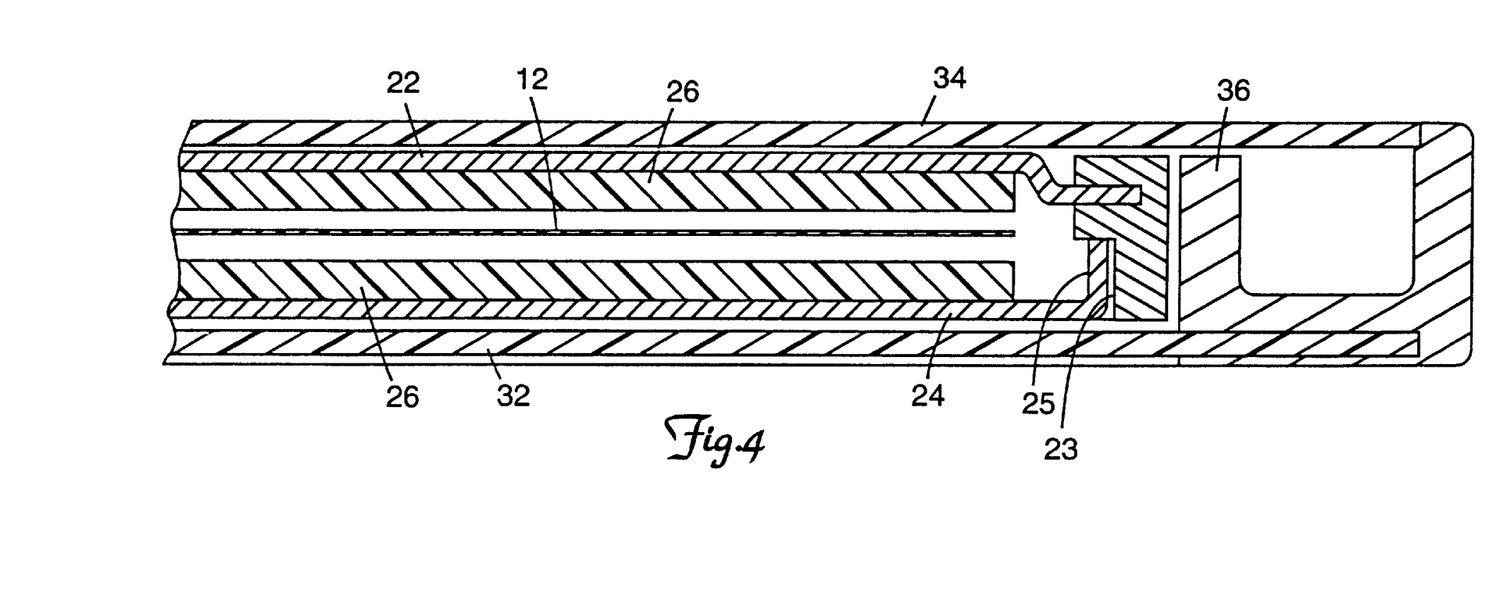
FIG. 4 is an enlarged partial cross-sectional view of the removable data storage cartridge of FIG. 2 taken along line 4—4 in FIG. 2.

FIG. 4 is an enlarged partial cross-sectional view of the removable data storage cartridge 10 taken along line 4—4 in FIG. 2 and illustrates the construction of a portion of one removable data storage cartridge according to the present invention. The media 12 is located between two layers of liner material 26 which are, in turn, located within the shutter base 22 and shutter cover 24. At the outer edge of the shutter cover 24, the sidewall 25 turns downward and fits within the lip 23 of the shutter base 22. It is preferred that the shutter cover 24 be retained within the shutter base 22 by a slip fit. Alternatively, the shutter base 22 and the shutter cover 24 may be attached together by more permanent techniques.

The shutter assembly 20, including the shutter base 22, shutter cover 24 and enclosed media 12, is located between the cartridge housing base 32 and the cartridge housing cover 34. It is preferred that the shutter assembly 20 rotate freely within the cartridge housing base and cover 32 and 34. The cartridge housing cover 34 includes a retaining ring 36 extending between the cartridge housing cover 34 and the cartridge housing base 32. The cartridge base 32 is attached to the cartridge housing cover 34 by any suitable technique including, but not limited to: ultrasonic welding, adhesives, mechanical fasteners, etc.

Figure 5:
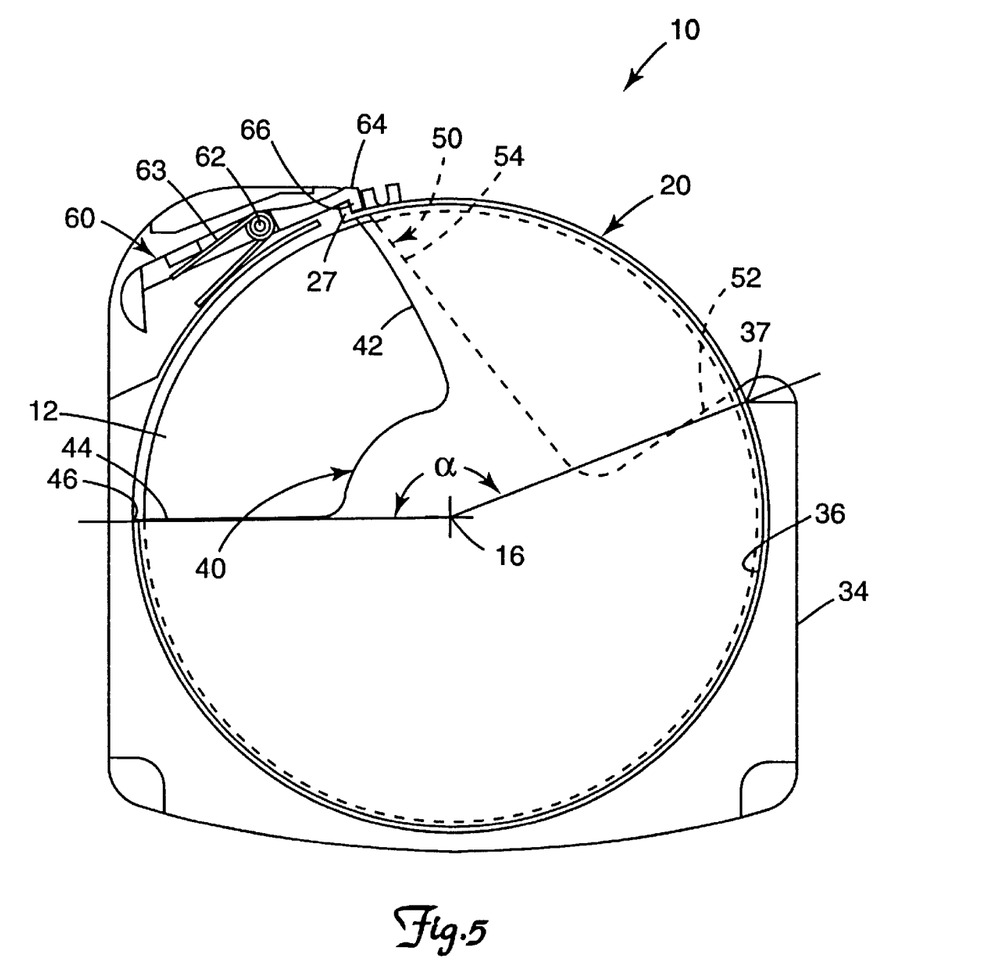
FIG. 5 is a plan view of a removable data storage cartridge according to the present invention, with the cartridge housing cover removed and the shutter assembly in the closed and latched position.

In FIG. 5, the cartridge housing base has been removed, exposing the relationship between the shutter assembly 20 and the retaining ring 36 in the cartridge housing cover 34 of the illustrated removable data storage cartridge 10. The retaining ring 36 preferably terminates at point 37 proximate the first edge 52 of the cartridge window 50. When the shutter assembly 20 is in the closed position as depicted in FIG. 5, the intersection point 46 between the trailing edge 44 of the shutter window 40 and the outer circumference of the shutter assembly 20 is located within the area of the retaining ring 36.

To adequately retain the shutter assembly 20 within the area defined by the retaining ring 36, the included angle α formed by point 46, axis of rotation 16, and point 37 is preferably less than about 180 degrees, more preferably less than about 170 degrees, and even more preferably less than about 160 degrees. By limiting angle α to those values, the shutter assembly 20 is retained within the cartridge 10 by interference between the outer circumference of the shutter assembly 20 and the inner surface of the retaining ring 36. If these limits are not maintained, then, in some positions, the shutter assembly 20 may allow the outer circumference of the media 12 to contact the retaining ring 36. That contact could cause wrinkling or other undesired deformation of the media 12.

Also depicted in FIG. 5 is one preferred latching mechanism for retaining the shutter assembly 20 in the closed position. The preferred latch mechanism illustrated in FIG. 5 includes an arm 60 mounted for rotation about pivot 62. At one end, the arm 60 includes a latch end 64 designed to cooperate with the shutter assembly 20 to prevent the shutter assembly 20 from rotating to the open position. In the illustrated embodiment, the latch end 64 of the arm 60 includes a hook 66 that mates with a catch 27 on the shutter assembly 20 to prevent rotation of the shutter assembly 20.

The arm 60 is preferably mounted on the pivot 62 such that it is biased for rotation in the clockwise direction in FIG. 5. The preferred embodiment includes torsion spring 63 to provide the biasing force, although those skilled in the art will recognize that the biasing force on the arm 60 can be provided by a variety of mechanisms including, but not limited to coil springs, leaf springs, etc.

Figure 6:
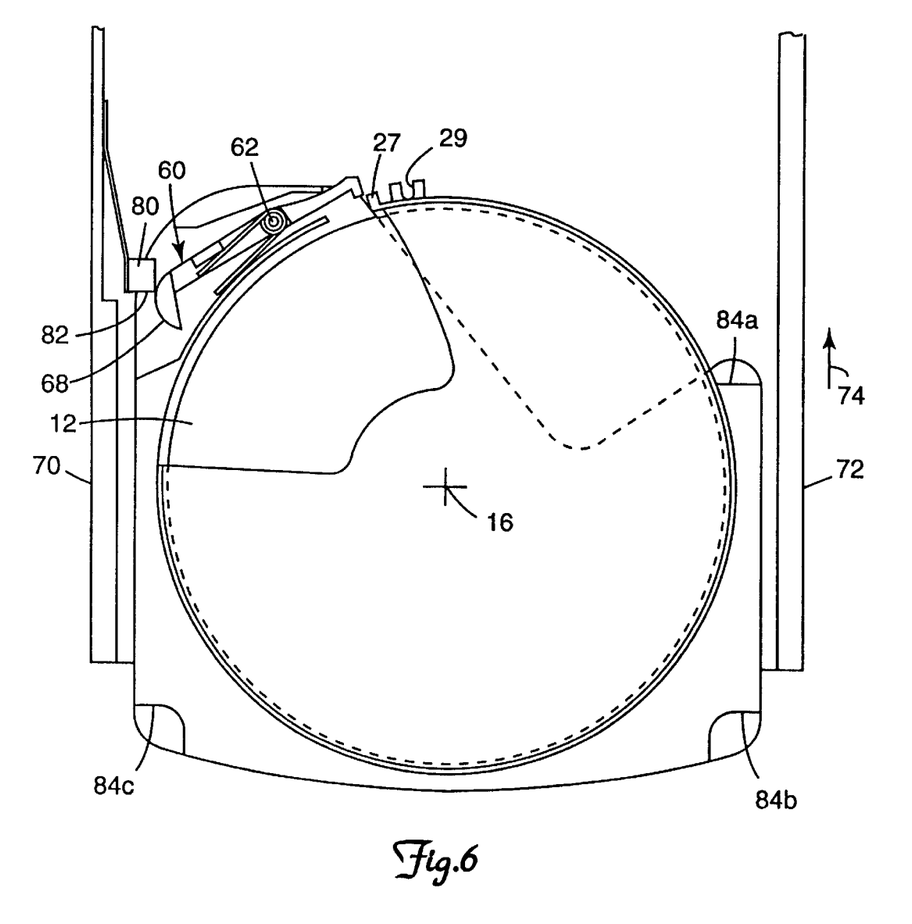
FIG. 6 is a plan view of the removable data storage cartridge of FIG. 5 with the shutter assembly unlatched and partially open.

FIG. 6 illustrates the opening of the latch mechanism to allow for rotation of the shutter assembly 20 about the axis of rotation 16. As the removable data storage cartridge 10 is inserted into a drive defined by sidewalls 70 and 72 and moved in the direction indicated by arrow 74, an actuator 80 located within the sidewalls 70 and 72 of the drive is forced against the actuating end 68 of the arm 60. The actuator 80 forces the arm 60 to rotate counter-clockwise about pivot 62, i.e., the actuator 80 causes the arm 60 to rotate against its biasing force. That movement causes the latching mechanism to disengage, thereby allowing the shutter assembly 20 to rotate within the removable data storage cartridge 10.

It is preferred that the arm 60 is preferably located between the two outer sides of the cartridge housing 30 to reduce the likelihood that the arm 60 can be rotated about pivot 62 to release the shutter assembly 20 when in its closed and latched position.

Actual rotation of the shutter assembly 20 between the open and closed positions is caused, in the depicted embodiment, by a pin (not shown) that engages with notch 29 on the shutter assembly 20 to rotate it about axis 16 such that the media 12 is exposed within the cartridge window 50. That same notch 29 and pin are also used to rotate the shutter assembly 20 into the closed position. A similar design for moving a rotary shutter between the open and closed positions can be found in, e.g., U.S. Pat. No. 5,636,095 (McGrath et al.). Other means for rotating the shutter assembly 20 between the open and closed positions will be known to those skilled in the art.

The removable data storage cartridge 10 also preferably includes a keying mechanism on the removable data storage cartridge 10 to prevent insertion of the removable data storage cartridge 10 into a drive in the wrong orientation, i.e., upside down and/or backwards. In the illustrated removable data storage cartridge 10, the keying mechanism is provided by a series of stops 84a, 84b and 84c (collectively referred to as stops 84) located proximate three of the corners of the removable data storage cartridge 10 (best seen in FIG. 6). The fourth corner includes the arm 60 used to release the shutter assembly 20 from its latched position. The keying mechanism also includes the actuator 80 on which a flat 82 is located. If the removable data storage cartridge 10 is inserted into the drive in the wrong orientation, the flat 82 on the actuator 80 will but up against one of the stops 84 on the removable data storage cartridge 10, thereby preventing its complete insertion into the drive. Those skilled in the art will recognize other keying mechanisms and/or means for keying removable data storage cartridges according to the present invention.

Various modifications and alterations of this invention will become apparent to those skilled in the art without departing from the scope of this invention. Accordingly, it is to be understood that this invention is not to be limited to the illustrative embodiments set forth herein, but is to be controlled by the limitations set forth in the following claims and any equivalents thereof.

What is claimed is:

1. A removable data storage cartridge comprising:
   data storage media comprising a circular disk;
   a shutter assembly enclosing a portion of the media, the media mounted for rotation within the shutter assembly about an axis of rotation;
   a shutter window in the shutter assembly exposing an arc of less than 180 degrees of the outer circumference of the media;
   a cartridge housing enclosing at least a portion of the shutter assembly and the media; the shutter assembly mounted for rotation within the cartridge housing about the axis of rotation;
   a retaining ring within the cartridge housing, the retaining ring encircling more than half of the circumference of the shutter assembly, the shutter assembly mounted for rotation about the axis of rotation within the retaining ring; and
   a cartridge window in the cartridge housing;
   wherein the shutter assembly and cartridge housing are movable between an open position in which the shutter window is generally aligned with the cartridge window to expose a portion of the media and a closed position in which the media is generally enclosed within the shutter assembly and the cartridge housing.

2. A cartridge according to claim 1, wherein the included angle formed by the intersection point between the retaining ring and the shutter assembly, the axis of rotation, and the intersection point between a trailing edge of the shutter window and the outer circumference of the shutter assembly is less than 180 degrees when the shutter assembly and cartridge housing are in the closed position.

3. A cartridge according to claim 1, wherein the included angle formed by the intersection point between the retaining ring and the shutter assembly, the axis of rotation, and the intersection point between a trailing edge of the shutter window and the outer circumference of the shutter assembly is about 170 degrees or less when the shutter assembly and cartridge housing are in the closed position.

4. A cartridge according to claim 1, wherein the included angle formed by the intersection point between the retaining ring and the shutter assembly, the axis of rotation, and the intersection point between a trailing edge of the shutter window and the outer circumference of the shutter assembly is about 160 degrees or less when the shutter assembly and cartridge housing are in the closed position.

5. A cartridge according to claim 1, further comprising cleaning material located within the shutter assembly, whereby the media is cleaned during rotation within the shutter assembly.

6. A cartridge according to claim 1, further comprising means for engaging the shutter assembly for rotation about the axis of rotation.

7. A cartridge according to claim 1, further comprising means for latching the shutter assembly and cartridge housing in the closed position.

8. A cartridge according to claim 1, wherein the media comprises flexible magnetic data storage media.

9. A removable data storage cartridge comprising:
   data storage media comprising a circular disk of flexible magnetic data storage media;
   a shutter assembly enclosing more than half of the outer circumference of the media, the media mounted for rotation within the shutter assembly about an axis of rotation;
   a shutter window in the shutter assembly, the shutter window exposing an arc of less than 180 degrees of the outer circumference of the media;
   a cartridge housing enclosing at least a portion of the shutter assembly and the media;
   a retaining ring in the cartridge housing, the retaining ring encircling more than half of the circumference of the shutter assembly, the shutter assembly mounted for rotation about the axis of rotation within the retaining ring; and
   a cartridge window in the cartridge housing;
   wherein the shutter assembly and cartridge housing are movable between an open position in which the shutter window is generally aligned with the cartridge window to expose a portion of the media and a closed position in which the media is generally enclosed within the shutter assembly and the cartridge housing, and further wherein the included angle formed by the intersection point between the retaining ring and the shutter assembly, the axis of rotation, and the intersection point between a trailing edge of the shutter window and the outer circumference of the shutter assembly is less than 180 degrees when the shutter assembly and cartridge housing are in the closed position.

10. A cartridge according to claim 9, further comprising cleaning material located within the shutter assembly, whereby the media is cleaned during rotation within the shutter assembly.

11. A method of manufacturing a removable data storage cartridge comprising:
    locating data storage media comprising a circular disk within a shutter assembly, wherein the shutter assembly includes a shutter window having a leading edge and trailing edge, the shutter window exposing an arc of less than 180 degrees of the outer circumference of the media, and further wherein the media is mounted for rotation within the shutter assembly about an axis of rotation; and locating the shutter assembly and media within a cartridge housing, the shutter assembly mounted for rotation within a retaining ring in the cartridge housing the retaining ring encircling more than half of the circumference of the shutter assembly, about the axis of rotation, wherein the retaining ring of the cartridge housing includes a cartridge window;

wherein the shutter assembly and cartridge housing are movable between an open position in which the shutter window is generally aligned with the cartridge window to expose a portion of the media and a closed position in which the media is generally enclosed within the shutter assembly and the cartridge housing.

12. A method according to claim 11, further comprising locating cleaning material within the shutter assembly, whereby the media is cleaned during rotation within the shutter assembly.

13. A method according to claim 11, wherein the shutter assembly comprises a shutter base and a shutter cover, and further wherein the step of locating the media within the shutter assembly comprises locating the media between the shutter base and the shutter cover and attaching the shutter base to the shutter cover, wherein the media is captured within the shutter assembly.

14. A method according to claim 13, further comprising locating cleaning material within the shutter assembly, whereby the media is cleaned during rotation within the shutter assembly.

15. A method according to claim 11, further comprising testing the media within the shutter assembly before locating the shutter assembly within the cartridge housing.

16. A method according to claim 11, wherein the cartridge housing comprises a cartridge base and a cartridge cover, and further wherein the step of locating the shutter assembly within the cartridge housing comprises locating the shutter assembly between the cartridge base and the cartridge cover and attaching the cartridge base to the cartridge cover, wherein the shutter assembly is captured within the cartridge housing.

17. A method according to claim 11, wherein the media comprises flexible magnetic data storage media.

18. A method of manufacturing a removable data storage cartridge comprising:

locating data storage media comprising a circular disk within a shutter assembly, wherein the shutter assembly includes a shutter window having a leading edge and trailing edge, the shutter window exposing an arc of less than 180 degrees of the outer circumference of the media, and further wherein the media is mounted for rotation within the shutter assembly about an axis of rotation; and locating the shutter assembly and media within a retaining ring in a cartridge housing, the retaining ring encircling more than half of the circumference of the shutter assembly, the shutter assembly mounted for rotation about the axis of rotation within the retaining ring in the cartridge housing, wherein the cartridge housing includes a cartridge window;

wherein the shutter assembly and cartridge housing are movable between an open position in which the shutter window is generally aligned with the cartridge window to expose a portion of the media and a closed position in which the media is generally enclosed within the shutter assembly and the cartridge housing;

wherein the included angle formed by the intersection point between the retaining ring and the shutter assembly, the axis of rotation, and the intersection point between a trailing edge of the shutter window and the outer circumference of the shutter assembly is less than 180 degrees when the shutter assembly and cartridge housing are in the closed position.

19. A method according to claim 18, wherein the included angle formed by the intersection point between the retaining ring and the shutter assembly, the axis of rotation, and the intersection point between a trailing edge of the shutter window and the outer circumference of the shutter assembly is less than 170 degrees or less when the shutter assembly and cartridge housing are in the closed position.

20. A method according to claim 18, wherein the included angle formed by the intersection point between the retaining ring and the shutter assembly, the axis of rotation, and the intersection point between a trailing edge of the shutter window and the outer circumference of the shutter assembly is less than 160 degrees or less when the shutter assembly and cartridge housing are in the closed position.

* * * * *